Aug. 6, 1957 E. E. MILLER 2,801,661
SEED POTATO CUTTER
Filed Oct. 1, 1954 3 Sheets-Sheet 1

INVENTOR.
EVERETT E. MILLER
BY
ATTORNEY.

Aug. 6, 1957 — E. E. MILLER — 2,801,661
SEED POTATO CUTTER
Filed Oct. 1, 1954 — 3 Sheets-Sheet 2
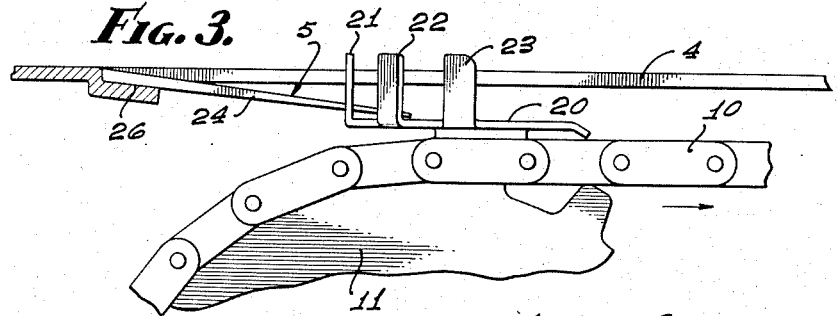
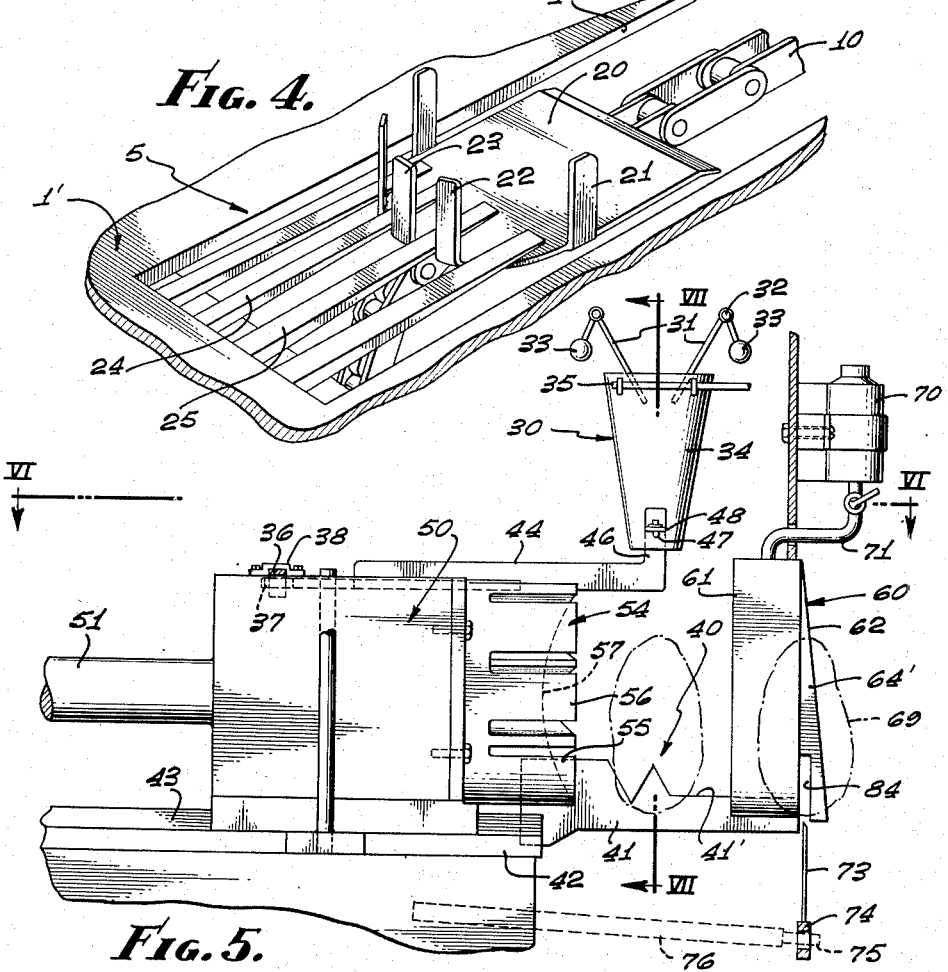
INVENTOR.
EVERETT E. MILLER
BY
ATTORNEY.

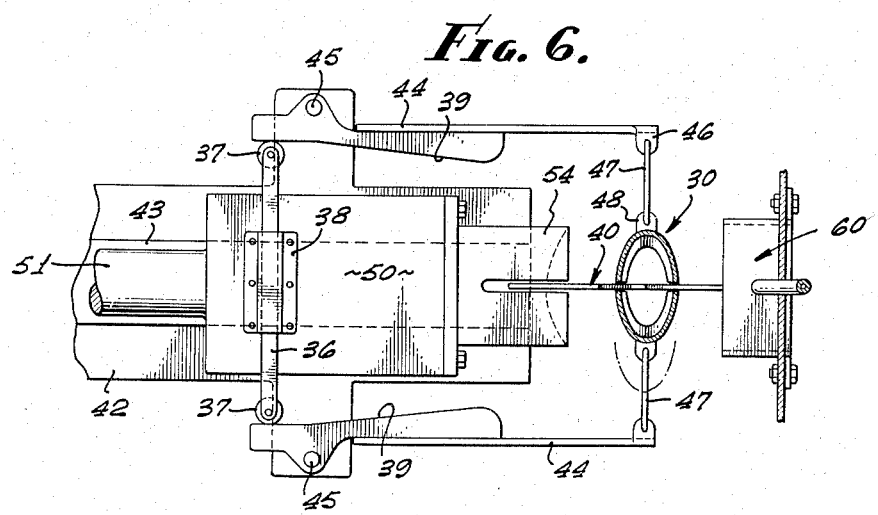
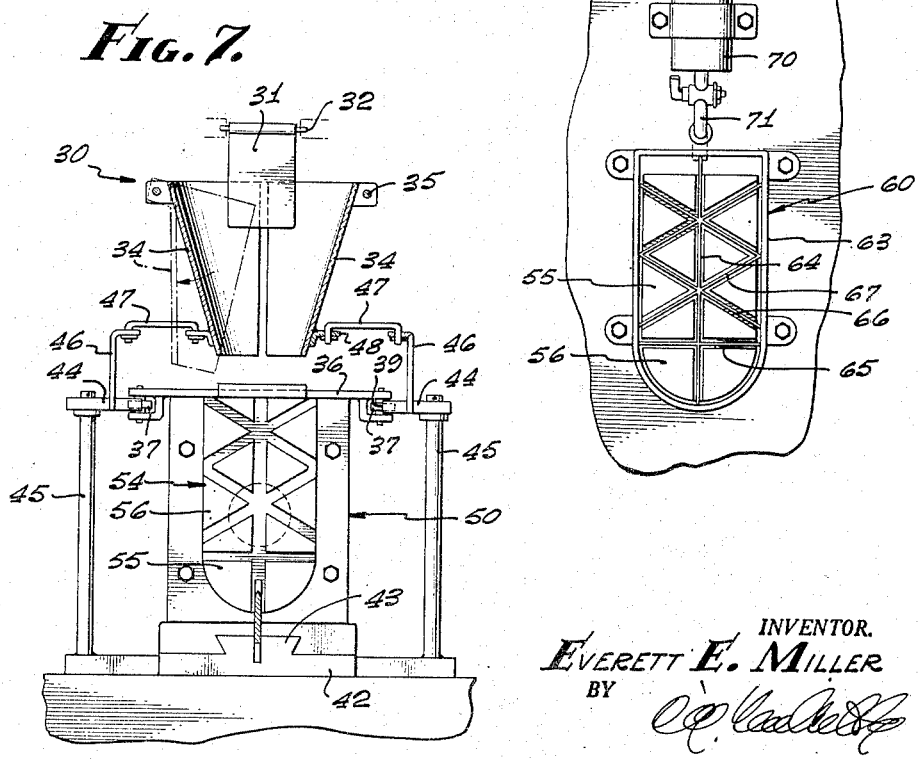
INVENTOR.
EVERETT E. MILLER

United States Patent Office 2,801,661
Patented Aug. 6, 1957

2,801,661

SEED POTATO CUTTER

Everett E. Miller, Venice, Calif., assignor to Zenith Processing Corporation, Venice, Calif., a corporation of California Application October 1, 1954, Serial No. 459,767

7 Claims. (Cl. 146—78)

This invention pertains to devices for rapidly, accurately and efficiently cutting potatoes into smaller pieces adapted for use as seed.

It is common knowledge that a potato has eyes and that by cutting a potato into sections so that an eye is carried by each of the sections, each of such sections becomes an effective seed. Various and sundry devices have been heretofore produced for cutting or slicing potatoes for seed purposes (see, for example, Patents No. 957,118 and No. 2,503,069). The present invention distinguishes from prior attempts in providing apparatus which produces a larger number of effective seed from a potato than was heretofore deemed possible and is capable of most effectively cutting potatoes into seed irrespective of the size of the potato. The invention takes into consideration a fact not heretofore observed, namely, that one end of a potato generally contains a larger number of eyes than the other end.

The apparatus of the present invention includes continuous feeding conveyor means, means for picking up and conveying potatoes by such conveyor in an oriented position, means for aligning potatoes, holding them in a desired position in proximity to a cutting grid, appropriate and improved means for pushing a potato, while in a predetermined position, through the cutting grid and auxiliary knife means for subjecting a desired end of the potato to additional transverse slicing so as to most effectively utilize the larger number of eyes present in such end of the potato.

Moreover, the entire device is arranged for most effective automatic operation permitting a single operator to intelligently and rapidly handle large quantities of potatoes and produce efficient seed therefrom.

It is an object of the present invention, therefore, to disclose and provide a new and improved apparatus for treating potatoes for seed.

A further object of the invention is to disclose and provide an apparatus for cutting potatoes for seed purposes in such manner as to most effectively utilize the eyes carried by such potatoes.

Again, an object of the invention is to disclose and provide new and improved longitudinally extending cutting grids.

A still further object of the invention is to disclose and provide combinations and arrangements of elements whereby potatoes may be effectively and rapidly cut into seed.

Other objects will become apparent to those skilled in the art from the following description of an exemplary form of the invention, it being understood that numerous modifications and changes may be made. During such description reference will be had to the appended drawings, in which:

Fig. 3 is an enlarged view, partly in longitudinal section, through the feeding portion of the work table illustrating the orienting and conveying means.

Fig. 4 is a perspective view of the means illustrated in Fig. 3.

Fig. 5 is an enlarged side elevation of the orienting, positioning and cutting means.

Fig. 6 is a horizontal view taken along the plane VI—VI of Fig. 5.

Fig. 7 is a vertical section taken along the plane VII—VII in Fig. 5.

Fig. 8 is an end view of the cutting grid and knife assembly.

Figure 1:
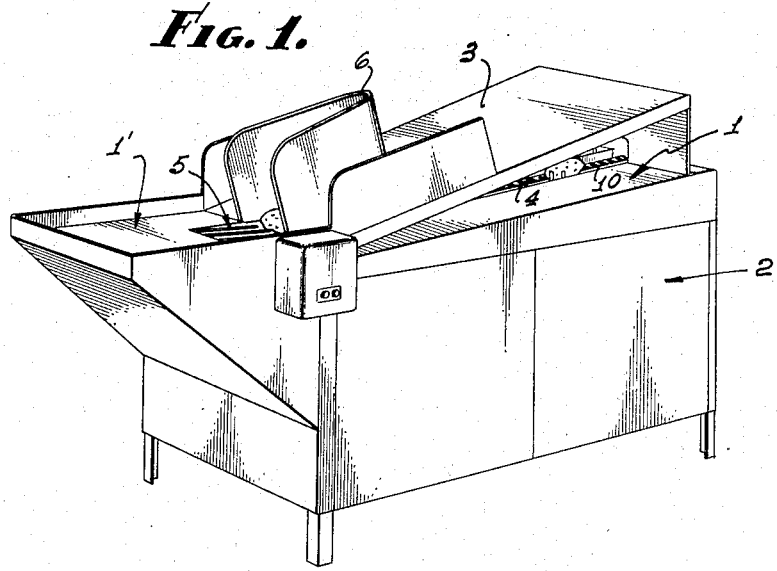
Fig. 1 is a perspective view of one form of device embodying the invention.

The form of device illustrated in Fig. 1 comprises a work table 1 forming the top surface of an enclosure or housing 2 which protects the contained equipment. It may be noted that the work table extends rearwardly beyond the housing and a feed chute 3 extends upwardly from the work table. This feed chute is adapted to receive a supply of potatoes and feed them by gravity onto the work table extension 1'. A longitudinally extending chain conveyor having an upper lay lying virtually in the plane of the work table operates within a longitudinal slit 4 formed in the work table, this slit extending from an orienting station or grizzly 5 adjacent the work table extension 1', a V-shaped partition 6 preventing potatoes from the feed chute 3 from haphazardly falling into the orienting zone 5.

Figure 2:
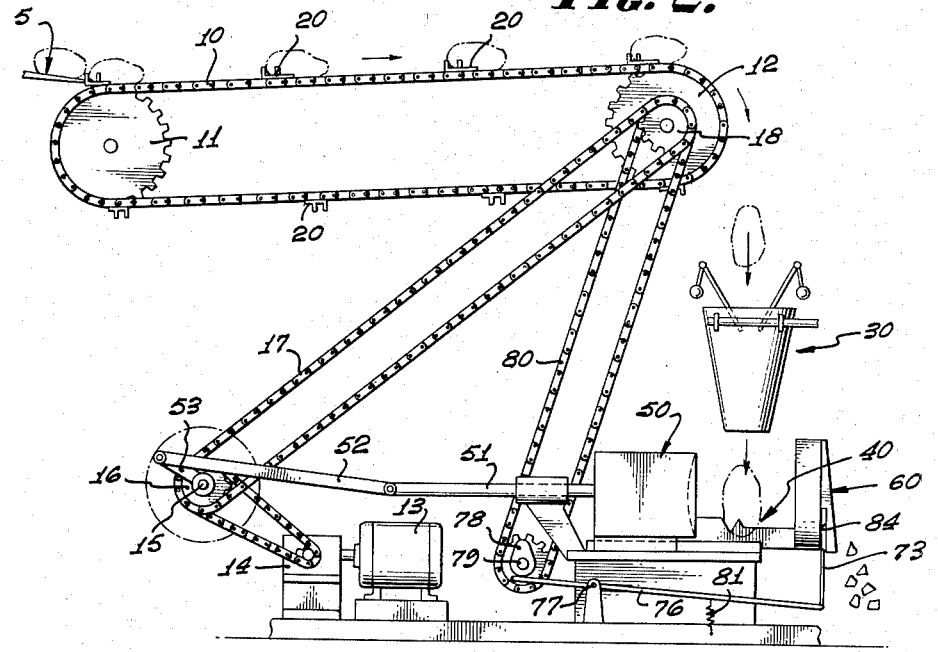
Fig. 2 is a somewhat diagrammatic representation in side view of the major portions and driving arrangements utilized.

As will be clearly evident from Fig. 2, the upper lay of the continuous chain conveyor 10 lies virtually in the plane of the work table 1 and is mounted upon suitable sprockets 11 and 12 carried by shafts suitably mounted within the housing 2 of the machine. Within the housing there is contained a driving motor 13 which may be provided with a reduction gearing 14 operably connected as by means of a drive chain with a drive shaft 15 carrying suitable sprockets or pulleys so as to permit said shaft to be driven at a desired and regulated speed. Sprocket 16 on drive shaft 15 may be connected as by means of a chain 17 to a sprocket 18 mounted on the shaft bearing conveyor chain sprocket 12, thereby causing said conveyor to move from the orienting zone or grizzly 5 toward a discharge point immediately above potato-aligning means, generally indicated at 30, said means properly aligning the potato so that it falls in oriented position upon a spear means 40 in front of a pusher assembly 50 adapted to move the oriented potato into a cutting grid 60.

The pusher block assembly 50 is provided with a rod 51 pivotally connected by means of a link 52 to a crank arm 53 driven by drive shaft 15. Controlled reciprocating motion is thus imparted to the pusher block 50.

As previously indicated, one of the important elements of the present invention is the provision of means for properly orienting potatoes for seed cutting operations. In order to accomplish this objective rapidly, the machine is provided with an orienting zone best illustrated in Figs. 3 and 4. As there shown the work table 1 is provided with the longitudinal slit 4. Immediately beneath the plane of the work table is the upper lay of the chain 10. This conveyor chain carries spaced carriers such as the carrier 20 which is provided with a plurality of upstanding fingers such as 21, 22 and 23 at the trailing edge of the carrier 20. These fingers are preferably arranged in a semicircular or triangular manner. The orienting zone 5 comprises a plurality of parallel spaced grizzly bars such as 24 and 25, one end of each of said bars being firmly attached to the table as at 26, whereas the other ends of the bars, extending in the direction of the conveyor 10 and slit 4, are free. Preferably the bars 24, 25, etc. are inclined downwardly and are positioned in such manner with respect to the conveyor 10 and the carrier 20 as to permit the fingers 21, 22 and the like to move upwardly into the spaces between adjacent grizzly bars.

From the description given it will be evident that an operator standing at the rearward extension 1' of the work table has a quantity of potatoes fed to him by gravity from the feed chute 3 immediately adjacent the orienting zone 5 and can, with minimum effort, place the potatoes one at a time in a desired oriented position upon the grizzly bars. The moving conveyor 10 picks up the potatoes, without damaging them, upon caarriers such as 20 and conveys the potatoes in such oriented position to the opposite end of the machine.

When the potato reaches the opposite end of the machine and a carrier 20 begins to go around the sprocket 12 (Fig. 2) the potato will drop from the carrier into the vertical aligning device 30 in order to preclude the possibility of having the potato assume an undesired position upon the spear 40.

By referring to Figs. 5 to 8, inclusive, the vertical orienting device indicated generally at 30 may comprise a pair of opposing deflectors each comprising a plate 31 mounted to freely pivot upon aligned pins 32 disposed horizontally and at right angles to the direction of movement of the conveyor 10, i. e. transversely of the machine. Each of the plates 31 may be provided with a counterweight 33 tending to maintain the plate 31 in an inclined position, these plates 31 normally having their lower ends in proximity. Immediately below the aligning plates 31 is a further vertical aligning device consisting of two portions 34, each of said portions being in the form of a downwardly directed chute elliptical in horizontal section and tipping downwardly from a relatively large upper end to a small lower end. These two frustoconical chutes with flattened sides are mounted upon horizontal, longitudinally extending hinge pins 35 and are normally in the full-line position indicated in Fig. 7, the lower opening being sufficiently small to prevent a potato from falling therethrough. Positive controllable means are employed for moving these vertical aligning means 34 from the full-line position to the position indicated in dash lines in Fig. 7. When in dash-line position, a potato is liberated and falls upon the spear 40 in properly oriented position.

The spear 40 is an upstanding point or points formed in a longitudinally extending knife blade 41 carried by a stationary frame member 42 of the machine. The frame member 42 may be provided with suitable guides such as the dovetail 43 for guidingly supporting the pusher block assembly or crosshead 50, reciprocating motion being imparted to the crosshead by rod 51. The crosshead is preferably provided with a transverse arm 36, each end of the arm being provided with a roller 37. The arm 36 may be connected to the top of the crosshead 50 by means of a fastener plate 38. The roller 37 contacts a cam face 39 formed in an arm 44 mounted for oscillating movement upon a vertical post 45 carried by the base frame member 42. The end of the arm 44 is provided with an upstanding portion 46, the upper end thereof being linked as by link 47 to a bracket 48 carried by the lower portion of the aligning element 34.

It will be evident that as the crosshead and pusher block assembly move to the right in Figs. 5 and 6, the roller 37 will cause the arm 44 to pivot about the post 45 and open the vertical aligning device 34 by causing them to pivot outwardly about pins 35 into the dash line position indicated in Fig. 7. The precise instant at which the vertical aligning devices 34 are caused to open may be controlled by the contours of the cam face 39 and by the position of the roller bearing arm 36. The fastening bracket 38 may be attached to the upper surface of the crosshead 50 at various positions with respect to the face of the pusher block. A biasing spring (not shown) may act upon arm 44 so as to positively bias the arm into contact with the roller 37 at all times.

The crosshead 50 is provided with a pusher block 54 having a plurality of bosses such as 55 and 56 adapted to extend into the cutter blade assembly of grid 60. The pushing face of the pusher block (or the combined face of all of the bosses) is concaved as indicated by dash line 57 in Fig. 5 so as to more or less conform to the convex, external surface of a potato and apply pressure to a potato uniformly as such potato is pushed through the cutting grill 60.

The cutting grid assembly preferably used includes a front cutting face indicated at 61 and a rear face 62 spaced therefrom, both faces lying in parallel, vertical, transverse planes. The grid comprises a plurality of angularly related cutting blades lying in planes perpendicular to the cutting face 61. In the form preferred, the assembly consists of an outer housing 63, a vertically, centrally disposed cutting blade 64 extending rearwardly beyond the plane 62, as indicated at 64', and other horizontal and inclined intersecting blades such as 65, 66, 67 and the like. The specific arrangement of cutting blades illustrated in Fig. 8 has been found particularly effective in producing potato seed of high vitality. It may be noted at this time that the longitudinally extending blade 41 which carries the spear 40 is provided with a furcated portion extending into the cutting grid, the upper, horizontally disposed cutting edge 41' of such blade being somewhat above the lowermost portion of the housing 63.

It may be also noted and observed that the various bosses 55, 56, and the like are of a contour adapted to slide into the spaces between cutting blades of the grid 60. For example, boss 55 is in the form of one quarter of a cylinder, boss 56 is substantially triangular, etc. The faces of said bosses, as previously indicated, are concaved, and the length of stroke of the crosshead 50 is preferably so adjusted that a potato pushed from its spear 40 into the cutting grid is left with approximately one half of the potato extending beyond the rear face of the grid, the remainder of the potato being contained within the grid as indicated by dash lines 69 in Fig. 5.

Desirably the various cutting blades 65, 66, 67 and the like of the cutting grid have sharp edges directed toward and forming the cutting face 61 and may also be perforated so as to facilitate the distribution of a treating agent, such as a fungicide, over the cutting blades. Fungicide may be distributed to the cutting blades in any suitable, as for example, from a supply tank 70 provided with a regulatable, downwardly directed, valved drip 71. The fungicide so supplied is distributed over the surfaces of the various blades (distribution being facilitated by judiciously formed perforations or grooves in the body of the blades) so that during cutting the cut faces of the potato seeds are automatically treated with a fungicidal, bacteriacidal or antiseptic solution, insuring that the seeds retain their vitality and not rot during storage or shipment prior to planting. A suitable fungicide solution can also be fogged upon the cutting blades from a suitable nozzle in timed relation to the movement of the pusher block 54, solution being supplied from a supply tank to a nozzle by means of a pump operated by an eccentric and rod or other means driven by shaft 79.

In order to obtain the maximum number of seed from a given potato it is not only important to orient it properly but also to impart an added cut. The device is therefore provided with an auxiliary knife blade 73 arranged for movement in a plane parallel to and substantially coplanar with rear face 62 of the cutting grid assembly. Vertical edges of the cutting blade 63 cooperate with suitable vertical guides. The lower end of the knife is provided with a holder 74 which may have an aperture therein, end 75 of actuating rod 76 extending through such aperture. Actuating rod 76 (as best shown in Fig. 2) is pivoted at 77, the opposite end of the actuating rod cooperating with a cam 78 mounted upon a shaft 79 driven by suitable means, such as chains 80, either from drive shaft 15 or conveyor shaft 12. Biasing spring 81 is illustrated as maintaining the auxiliary knife blade 73 in a normally withdrawn position, such spring also insuring constant contact between the actuating rod 76 and cam 78.

It is not necessary for the auxiliary knife 73 to slice the entire potato longitudinally; in actual practice it has been found desirable to impart the auxiliary axial cut to one end of the potato and preferably to only about one third of the potato. For this reason, as shown in Fig. 5, the outstanding portion 64' of vertical blade 64 is provided with a slot 84 to receive the knife 73. It may be noted at this time that the protruding or outstanding portion 64' holds the potato in position and prevents the lower portions of the potato from falling out of the cutting grill before the auxiliary knife 73 performs its operation.

I claim:

1. An apparatus for treating potatoes for seed comprising: a continuous feeding conveyor provided with means for receiving and conveying potatoes in axial alignment; a cutting grid positioned below the level of the discharge end of said conveyor, said cutting grid having a vertical cutting face composed of a plurality of angularly related cutting blades lying in planes perpendicular to said face; potato-aligning means between the discharge end of said conveyor and the level of said cutting grid, said potato aligning means being adapted to receive a potato from said conveyor; stationary spear means adjacent the face of the grid adapted to hold a potato received from said aligning means with the major axis of such potato virtually parallel to the cutting face of the grid; a pusher provided with a plurality of bosses adapted to extend between blades of said grid, said bosses having ends forming a virtually concave pusher face, said bosses extending between cutting blades and adapted to push a potato from said spear means into and partly through said grid; and means for driving said feeding conveyor and reciprocating said pusher in timed relation.

2. An apparatus of the character stated in claim 1, including an auxiliary knife lying in a plane parallel to said cutting face and spaced therefrom and means for reciprocating said auxiliary knife in timed relation with said pusher, whereby said auxiliary knife cuts into a potato pushed partly through said grid by said pusher.

3. In an apparatus of the character stated in claim 1, the provision of means for actuating the aligning means in timed relation to said means for driving the feeding conveyor and reciprocating said pusher.

4. An apparatus of the character stated in claim 1, wherein the continuous feeding conveyor is mounted upon a work table including a grizzly upon which a potato can be placed in oriented position, said continuous feeding conveyor being provided with means for picking up potatoes from said grizzly and conveying said potatoes in oriented position and axial alignment.

5. An apparatus as stated in claim 1 including pivotally mounted arms for actuating said potato-aligning means to release a potato therefrom and means carried by the pusher and cooperating with said arms for releasing a potato from said aligning means in timed relation to the reciprocation of the pusher.

6. An apparatus as stated in claim 1 wherein said potato-aligning means comprises an upper pair of pivotally mounted, opposing deflectors biased toward each other and a pair of opposing, frustoconical chutes movably positioned beneath said deflectors, said chutes being adapted to align, retain and release a potato upon movement of said chutes in opposite directions, and means for moving said chutes in timed relation to the reciprocation of said pusher.

7. An apparatus as stated in claim 1, wherein said feeding conveyor comprises a continuous chain provided with spaced carriers, each carrier including upstanding fingers at the trailing edge of the carrier arranged nonlinearly with respect to the direction of movement of the conveyor.

References Cited in the file of this patent

UNITED STATES PATENTS

| 478,263 | Moss | July 5, 1892 |
|---|---|---|
| 1,459,246 | Parker | June 19, 1923 |
| 2,521,590 | Manuel | Sept. 5, 1950 |
| 2,601,233 | Spry | June 24, 1952 |
| 2,692,629 | Gardner | Oct. 26, 1954 |